United States Patent [19]
Millar et al.

[11] 3,896,843
[45] July 29, 1975

[54] PILOT VALVE FOR CONTROLLING A FLUID PRESSURE OPERATED VALVE

[75] Inventors: James S. Millar, Fountain Valley; Glenn W. Henderson, Tustin, both of Calif.

[73] Assignee: Parker-Hannifin Corporation, Cleveland, Ohio

[22] Filed: Dec. 13, 1973

[21] Appl. No.: 424,199

Related U.S. Application Data

[62] Division of Ser. No. 359,464, May 11, 1973, Pat. No. 3,820,556.

[52] U.S. Cl. ............... 137/486; 251/360; 251/61.4; 137/488
[51] Int. Cl. ..................... G05d 7/03; F16k 31/363
[58] Field of Search .......... 251/61.4, 61, 61.2, 147, 251/63.5, 63.6, 360; 137/488

[56] References Cited
UNITED STATES PATENTS

| | | | |
|---|---|---|---|
| 1,923,788 | 8/1933 | Mastenbrook | 251/61.4 |
| 3,221,764 | 12/1965 | Elbogen et al. | 137/486 X |
| 3,664,362 | 5/1972 | Weise | 137/488 X |

*Primary Examiner*—Henry T. Klinksiek
*Attorney, Agent, or Firm*—John N. Wolfram

[57] ABSTRACT

A system for controlling the rate of fluid flow through a main fluid pressure operated valve that is controlled by a pilot valve. The pilot valve includes a movable wall responsive to pressure differential in the main system and also includes relatively movable seat and plug members that control flow of control fluid associated with the main valve, one of the members being activated by the movable wall to vary the relative positions of the members, and one of said members being movable by a manual means to vary the relative position of the members whereby the flow rate through the main valve at a given supply pressure may be varied. The invention also includes the arrangement of the pilot valve in which the manual means is mechanically and non-yieldingly connected to one of the valve elements of the pilot valve for positive movement thereof by the manual means.

2 Claims, 3 Drawing Figures

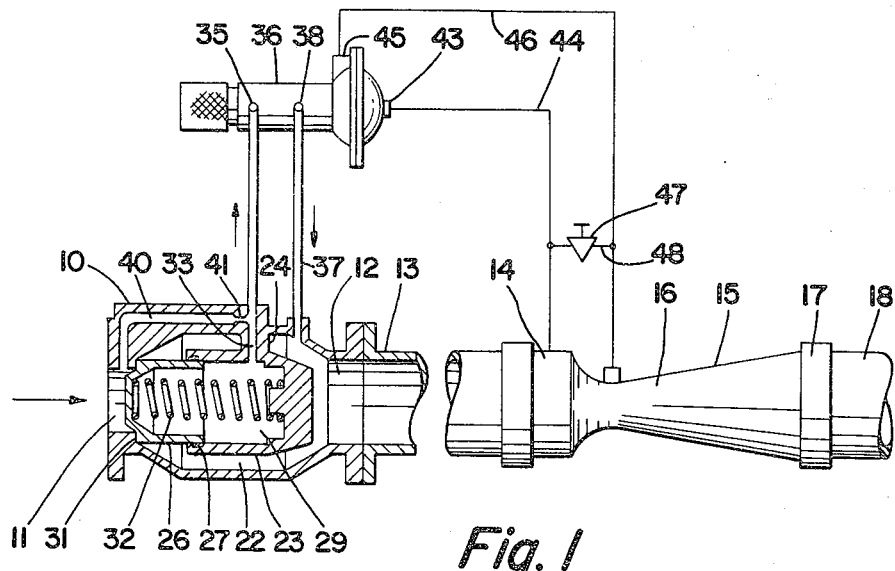
Fig. 1
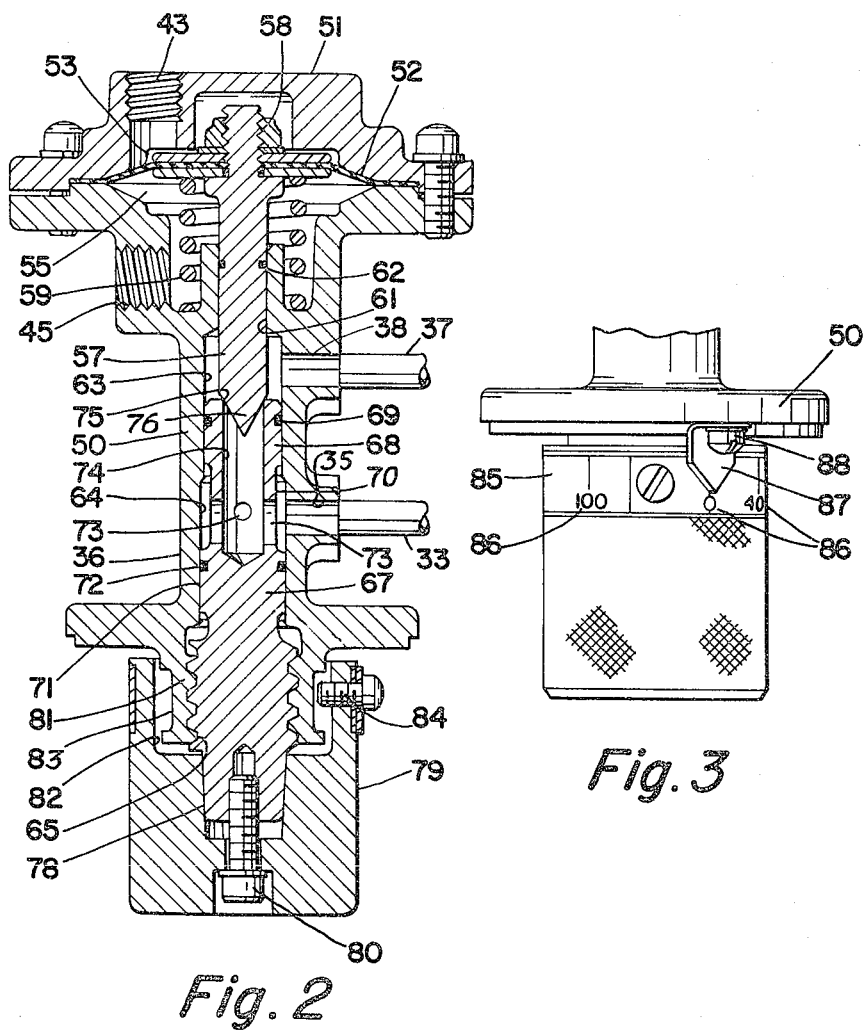
Fig. 2
Fig. 3

PILOT VALVE FOR CONTROLLING A FLUID PRESSURE OPERATED VALVE

REFERENCE TO PRIOR APPLICATION

This application is a division of U.S. application Ser. No. 359,464 filed May 11, 1973, now U.S. Pat. No. 3,820,556.

BACKGROUND OF THE INVENTION

In previous systems for controlling flow of fluid, such as systems for filling an aircraft fuel tank from a ground supply, it is known to utilize a fluid pressure operated main valve controlled by a pilot valve for delivering fluid at a predetermined rate of flow according to selected differentials in pressure at selected parts of the system and to provide a means for changing the setting of the pilot valve for changing the flow rate through the main valve. Two such previous arrangements are shown in U.S. Letters Patents 2,868,226 and 3,177,891. However, such previous systems employ a manually adjustable spring for varying the setting of the pilot valve and thus are dependent upon the accuracy and stability of the spring for making adjustments in the pilot valve setting and hence in the main valve flow rate.

SUMMARY OF THE INVENTION

The present invention provides a pilot valve that is responsive to a differential in pressures between selected locations on one side of a main valve to control the flow rate through a main fluid pressure operated valve. The pilot valve is manually adjustable for causing the flow rate through the main valve to vary. The pilot valve includes two relatively movable members which when engaged prevent flow through the pilot valve and when not engaged are relatively positionable to vary the flow through the pilot valve, which in turn causes the flow through the main valve to vary. The manually adjustable means is directly, that is, non-yieldingly connected to one of the pilot valve movable members to vary its position in a positive or fixed manner.

DETAIL DESCRIPTION

FIG. 1 is a schematic view of the system.

FIG. 2 is a longitudinal cross section through the pilot valve.

FIG. 3 is an external partial view of the pilot valve.

The system includes a main valve 10 having an inlet port 11 connectable to a supply of liquid fuel and an outlet port 12 connectable to a conduit 13 leading to the inlet 14 of a venturi tube 15 that has a throat 16 and an outlet 17 connectable to a conduit 18 which leads to a nozzle, not shown, for attachment to an aircraft fuel tank to be filled.

Main valve 10 has a valve chamber 22 in which a cup shaped member 23 is mounted by means of several circumferentially spaced spider elements 24. A main valve member 26 is slidably mounted within cup shaped member 23 and is sealed relative thereto by a packing ring 27 so that the interior of valve member 26 and cup shaped member 23 form a pressure chamber 29. Valve 10 includes a valve seat 31 against which valve member 26 is normally pressed by a spring 32. A passage or conduit 33 passing through one of the spider elements 24 connects pressure chamber 29 with an inlet port 35 of a pilot valve 36 and another conduit 37 connects an outlet port 38 of pilot valve 36 with the downstream or outlet side of main valve 10. A bypass passage 40 having a restriction 41 therein connects main valve inlet 11 with passage 33.

Pilot valve 36 has a high pressure port 43 connected by a conduit 44 with the inlet side 14 of venturi 15 and has a low pressure port 45 connected by conduit 46 with throat 16 of the venturi. An adjustable needle type restricter valve 47 is in a conduit 48 that connects conduits 44 and 46.

Pilot valve 36 has a body or housing 50 to which is attached a cap 51 that clamps a flexible diaphragm 52 thereto. The diaphragm constitutes a movable wall that divides a first chamber between the body and cap into a high pressure compartment 53 that communicates with port 43 and a low pressure compartment 55 that communicates with low pressure port 45. Diaphragm 52 is clamped to a valve plug member 57 by a threaded nut 58 and a spring 59 urges valve plug 57 toward cap 51.

Body 50 has a bore 61 in which valve plug 57 is slidably mounted and sealed by a packing 62. Bore 61 leads to a second chamber comprising first counterbore 63 and a slightly larger counterbore 64 having a threaded entrance 65.

A valve seat member 67 has a threaded connection with threaded portion 65 and has an inner cylindrical portion 68 slidable within counterbore bore 63 and sealed relative thereto by a packing 69. Seat member 67 has another cylindrical portion 71 slidable within counterbore 64 and sealed therein by packing 72. Intermediate valve seat portions 68 and 71 is a reduced diameter portion 72 which has several cross holes 73 therein which communicate inlet port 35 with a blind bore or passage 74 which forms a valve seat 75 at its outer end that is cooperable with a tapered seat 76 on valve plug 57 for controlling flow of fluid between inlet port 35 and outlet port 38.

The outer end of valve seat member 67 has a tapered wedge fit at 78 with a knob 79 and is locked thereto by a screw 80. At this end, body 50 has an extension 81 received within a bore 82 of knob 79 and also has an external groove 83 into which projects the inner end of a screw 84 threaded through the wall of knob 79. Clamped by screw 84 to knob 79 is a circular band 85 having circumferentially spaced indicia 86 thereon. A pointer 87 is clamped to body 50 by a screw 88 for cooperation with indicia 86.

OPERATION

With main valve inlet 11 connected to a source of supply and conduit 18 connected to a nozzle which in turn is connected to an aircraft tank to be filled, knob 79 is rotated until pointer 87 registers with the particular indicia 86 corresponding with the desired rate of flow through the main valve, which may be expressed in gallons per minute or any other desired manner. Rotation of knob 79 will cause valve seat member 67 to move axially within body 50 by virtue of threaded connection 65 for axially positioning valve seat 75 a predetermined distance from tapered seat 76 of valve plug 57, the latter at this time being held in its extreme upward position by spring 59. The system pump, not shown, is now turned on to deliver liquid fuel to main valve inlet port 11. The pressure of this fuel opens main valve member 26 and the fuel passes through main valve 10, conduit 13, venturi 15 and conduit 18 for delivery to the aircraft tank.

A portion of the fuel in inlet 11 is diverted by way of bypass 40 and conduit 33 to pressure chamber 29 and to pilot valve inlet 35 from which it passes through valve seat 75 to port 38 and via conduit 37 to main valve outlet 12. The inner end of main valve member 26 has an area defined by packing 27 that is larger than an area on its outer face defined by valve seat 31. Because pressure fluid may be exhausted from pressure chamber 29 through pilot valve 36 faster than it can pass through restriction 41, the pressure in chamber 29 at this time is lower than the pressure in valve inlet port 11 and main valve 26 remains open.

As the fluid passes through venturi 15, it has a higher pressure at venturi inlet 14 than at throat 16. The higher pressure is transmitted to the upper side of diaphragm 52 via conduit 44 and high pressure port 43 while the lower pressure from throat 16 is transmitted to the lower side of diaphragm 52 via conduit 46 and low pressure port 45.

When main valve member 26 has opened sufficiently wide to provide the flow rate preselected with knob 79, the differential in pressures at venturi inlet 14 and throat 16 will be such that this differential acting on pilot valve diaphragm 52 against spring 59 will move valve plug 57 to a position relative to valve seat 75 so that the pilot flow of fluid from conduit 33 to conduit 37 will maintain a particular pressure within chamber 29 to position valve member 26 relative to valve seat 31 for maintaining the desired flow rate through the system.

Changing of knob 79 to a different selected flow rate causes valve seat 75 to assume a different axial position within bore 63 and hence the amount of opening relative to plug seat 76 becomes changed when the latter has a fixed position corresponding to the given pressure differential between the inlet and throat of the venturi. Thus, knob 79 provides a manual means for selecting the desired flow rate through the system and accomplishes this by a direct mechanical connection between knob 79 and valve seat 75 so that axial movement of valve seat 75 is positive and directly related to rotary movement of knob 79. So that backlash or looseness due to manufacturing tolerances of threaded connection 65 will not cause inaccuracies in the flow rate settings, valve seat member 67 is provided with a differential area defined by the difference in diameters of bores 63, 64 whereby fluid pressure within bore 64 constantly acts downwardly upon this area and the area at the bottom of blind bore 74 to maintain member 67 in a downward position relative to the clearance in threaded section 65.

We claim:

1. A pilot valve comprising a housing having first and second chambers connected by a bore, a movable wall dividing the first chamber into high and low pressure compartments, a high pressure port for introducing fluid to the high pressure compartment and a low pressure port for introducing fluid to the low pressure compartment, a valve plug member connected to the movable wall and extending through said low pressure compartment and the bore into the second chamber, sealing means in said bore sealing the low pressure compartment from the second chamber, a counterbore in said housing, a valve seat member in said counterbore having a passage therethrough connectable to the second chamber and in constant communication with a third port that intersects said counterbore, a fourth port connected to the second chamber, manually operable means directly connected to the valve seat member and axially movable within said counterbore for positively adjusting the axial position of the valve seat member in said counterbore, said valve plug member and said valve seat member being cooperable for controlling flow of fluid between said passage and said second chamber, said means having a threaded connection directly with said housing for accomplishing said adjustment, another sealing means in contact with said valve seat member and the wall of said counterbore between said third port and said threaded connection that seals said threaded connection relative to said third port in the adjusted positions of said valve seat member.

2. The valve of claim 1 in which said housing has another counterbore between the first mentioned counterbore and said second chamber and of smaller diameter than said first mentioned counterbore, and said seat member has portions of different diameters sealed in said counterbores to provide a differential area facing away from said threaded connection, and said differential area being exposed to fluid in said third port to provide a force for constantly urging the valve seat member in a direction toward said threaded connection and said force being opposed by said threaded connection.

* * * * *